(12) United States Patent
Eakins et al.

(10) Patent No.: US 7,644,888 B2
(45) Date of Patent: Jan. 12, 2010

(54) HIGH-SPEED AIRCRAFT AND METHODS FOR THEIR MANUFACTURE

(75) Inventors: Mark E. Eakins, Kirkland, WA (US); Paul M. Wojciechowski, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1171 days.

(21) Appl. No.: 10/146,985

(22) Filed: May 15, 2002

(65) Prior Publication Data

US 2003/0213870 A1 Nov. 20, 2003

(51) Int. Cl.
*B64C 1/00* (2006.01)

(52) U.S. Cl. ................. 244/119; 244/117 R; 244/118.5; 244/118.6; 244/13

(58) Field of Classification Search .................. 244/119, 244/120, 117 R, 13, 12.1, 4 R, 118.5, 118.6
See application file for complete search history.

(56) References Cited

U.S. PATENT DOCUMENTS

| | | | |
|---|---|---|---|
| 2,604,276 A | 7/1952 | Huben | |
| 2,846,165 A | 8/1958 | Axelson | |
| 2,941,752 A | 6/1960 | Gluhareff | |
| 3,109,610 A | 11/1963 | Quenzler et al. | |
| 3,237,891 A | 3/1966 | Wotton | |
| 3,493,198 A | 2/1970 | Roed | |
| 3,592,415 A | 7/1971 | Walley et al. | |
| 3,680,816 A | 8/1972 | Mello | |
| 3,738,595 A | 6/1973 | Bouchnik | |
| 3,900,178 A | 8/1975 | Tupolev et al. | |
| 3,940,097 A | 2/1976 | Wilson et al. | |
| 3,948,469 A | 4/1976 | Brown | |
| 3,954,231 A | 5/1976 | Fraser | |

(Continued)

FOREIGN PATENT DOCUMENTS

EP 000547266 6/1993

(Continued)

OTHER PUBLICATIONS

AircraftMuseum.com/Vulcan, May 2001 (4 pages) Avro Vulcan Tactical Bomber http://www.aerospaceweb.org/aircraft/bomber/vulcan/index.shtml [Accessed Mar. 7, 2002].

(Continued)

*Primary Examiner*—J. Woodrow Eldred
(74) *Attorney, Agent, or Firm*—Perkins Coie LLP

(57) ABSTRACT

A high-speed transport aircraft. In one embodiment, the aircraft includes a fuselage, delta wings, and integrated engine nacelles. The fuselage is configured to carry a payload and has a forward portion and an aft portion. The aft portion defines a generally constant-width planform and includes first, second, third, and fourth passenger seat sections, with each of the seat sections having at least two passenger seats positioned abreast at least generally normal to a longitudinal axis of the fuselage. In one aspect of this embodiment, the wings extend from the fuselage adjacent to the aft portion, and the fuselage further includes first and second rows of windows above the wings. The first row of windows are positioned in the fuselage directly adjacent the first seat section and the second row of windows are positioned in the fuselage directly adjacent the fourth seat section.

101 Claims, 5 Drawing Sheets

U.S. PATENT DOCUMENTS

| | | | |
|---|---|---|---|
| 4,008,867 A | 2/1977 | Kaniut | |
| 4,026,500 A | 5/1977 | Grow | |
| 4,066,227 A * | 1/1978 | Buchsel | 244/118.6 |
| 4,116,405 A | 9/1978 | Bacchi et al. | |
| 4,378,097 A | 3/1983 | Ferguson et al. | |
| 4,478,377 A | 10/1984 | Fletcher et al. | |
| 4,478,378 A | 10/1984 | Capuani | |
| 4,579,300 A | 4/1986 | Carr | |
| 4,767,083 A | 8/1988 | Koenig et al. | |
| 4,899,958 A | 2/1990 | Horikawa | |
| 4,969,614 A | 11/1990 | Capuani | |
| 4,979,699 A | 12/1990 | Tindell | |
| D314,366 S | 2/1991 | Waaland et al. | |
| 5,008,867 A | 4/1991 | Ko | |
| D317,003 S | 5/1991 | Tribe et al. | |
| 5,167,383 A | 12/1992 | Nozaki et al. | |
| 5,170,964 A | 12/1992 | Enderle et al. | |
| 5,209,428 A | 5/1993 | Bevilaqua et al. | |
| 5,216,879 A | 6/1993 | Zysmaan | |
| 5,299,760 A | 4/1994 | Finch et al. | |
| 5,322,242 A | 6/1994 | Tracy | |
| 5,496,001 A | 3/1996 | Skow | |
| 5,529,263 A | 6/1996 | Rudolph | |
| 5,542,625 A | 8/1996 | Burhans, Jr. et al. | |
| RE35,387 E | 12/1996 | Strom | |
| D377,326 S | 1/1997 | Grossman et al. | |
| D381,938 S | 8/1997 | Grossman et al. | |
| D381,952 S | 8/1997 | Carter, Jr. | |
| D382,851 S | 8/1997 | Knutson et al. | |
| D386,143 S | 11/1997 | Astaire | |
| 5,749,542 A | 5/1998 | Hamstra et al. | |
| 5,769,358 A * | 6/1998 | Hahl et al. | 244/36 |
| D399,816 S | 10/1998 | Peacock | |
| 5,842,666 A | 12/1998 | Gerhardt et al. | |
| 5,897,076 A | 4/1999 | Tracy | |
| 5,897,078 A | 4/1999 | Burnham et al. | |
| 5,906,334 A | 5/1999 | Chamay et al. | |
| 5,961,068 A | 10/1999 | Wainfan et al. | |
| D417,184 S | 11/1999 | Hartmann et al. | |
| 6,065,720 A * | 5/2000 | Ash et al. | 244/120 |
| 6,079,667 A | 6/2000 | Gruensfelder | |
| 6,092,360 A | 7/2000 | Hoag et al. | |
| 6,138,957 A | 10/2000 | Nastasi et al. | |
| D437,284 S | 2/2001 | Knutson et al. | |
| D439,876 S | 4/2001 | Simonov et al. | |
| D453,014 S | 1/2002 | Fraser | |
| 6,398,158 B1 * | 6/2002 | Reeves | 244/12.1 |
| 6,527,224 B2 | 3/2003 | Seidel | |
| 6,568,632 B2 * | 5/2003 | Page et al. | 244/36 |
| 6,575,406 B2 | 6/2003 | Nelson | |
| 6,612,106 B2 | 9/2003 | Balzer | |
| 6,662,548 B1 | 12/2003 | Clark | |

FOREIGN PATENT DOCUMENTS

| | | |
|---|---|---|
| WO | WO-8200048 | 1/1982 |

OTHER PUBLICATIONS

Vulcan Status, Vulcan Restoration Trust, 1996 (2 pages) http://www.avrovulcan.com/vstats.html [Accessed Mar. 7, 2002].

"Photos Show Key Features of YF-23A ATF." *Aviation Week & Space Technology*. Jul. 1990.

"Rockwell/MBB X-31 Makes Second Flight, Reaching 20,000-Ft. Altitude, Mach 0.6." *Aviation Week & Space Technology*. Oct. 1990. p. 117.

Capone, Francis J. and David E. Reubush. "Effects of Varying Podded Nacelle-Nozzle Installations on Transonic Aeropropulsive Characteristics of a Supersonic Fighter Aircraft." NASA Technical Paper 2120. 1983.

Liebeck, R.H. et al., AIAA-98-0438, Blended-Wing-Body Subsonic Commercial Transport, 36th Aerospace Sciences Meeting and Exhibit, Jan. 12-15, 1998, Reno, Nevada, pp. 1 and 4.

NASA Technical Memorandum. Proceedings of the NASA Conference on Supersonic Transport Feasibility Studies and Supporting Research—Sep. 1963.

Scott, William B. "YF-23A Preview Design Features of Future Fighters." *Aviation Week & Space Technology*. Jul. 1990. p. 16-21.

* cited by examiner

HIGH-SPEED AIRCRAFT AND METHODS FOR THEIR MANUFACTURE

CROSS-REFERENCE TO RELATED APPLICATIONS

The present application incorporates copending patent application Ser. No. 09/815,390, entitled INTEGRATED AND/OR MODULAR HIGH-SPEED AIRCRAFT, filed Mar. 22, 2001 and having a common assignee with the present application, in its entirety by reference.

TECHNICAL FIELD

The following disclosure relates generally to high-speed aircraft configurations and, more particularly, to compact high-speed aircraft configurations usable in commercial air transport applications.

BACKGROUND

Transporting passengers and cargo by air is a highly competitive business. In order to remain competitive, commercial airlines are continually striving for ways to reduce the cost and travel time associated with air transport. One method for reducing the cost of air transport is to utilize aircraft having increased passenger and/or cargo capacity. Increasing the number of passengers and/or cargo containers on a given flight can accordingly reduce the per-passenger and/or per-container costs for that flight.

As aircraft evolve to accommodate more passengers and cargo, however, a number of negative trends develop. One such trend is the tendency for the weight of the airframe to increase. Another such trend is the tendency for both the surface area and the cross-sectional area of the airframe to increase. Each of these trends tends to increase the aerodynamic drag on the aircraft. For example, increases in weight increase induced drag (i.e., drag caused by generating lift); increases in surface area increase skin friction drag (i.e., drag caused by air flowing over the exterior surfaces of the airframe); and increases in cross-sectional area increase pressure drag (i.e., drag caused by air flowing normal to the cross-section of the airframe). These increases in drag can be offset by increases in engine thrust if the aircraft is to be capable of the relatively high airspeeds required for modern air travel. Unfortunately, however, increasing engine thrust generally requires increasing fuel consumption. As a result, the ability to reduce cost by increasing passenger and/or cargo capacity is often mitigated by the resultant increase in fuel consumption.

FIGS. 1A-C illustrate a side view, top view, and fuselage cross-sectional view, respectively, of a transonic transport aircraft 100 in accordance with the prior art. The aircraft 100 includes a fuselage 102, a tail 108, swept wings 104 extending from the fuselage 102 at a wing/body junction 105, and engine nacelles 106 suspended from the swept wings 104. As is known by those of ordinary skill in the relevant art, the "area rule" holds that the longitudinal distribution of the cross-sectional area of the aircraft 100 tends to dominate the "wave" drag experienced by the aircraft 100 due to air compressibility effects at speeds above about Mach 0.85. Accordingly, to reduce the wave drag at such speeds, the fuselage 102 has a significantly narrowed or "waisted" portion adjacent to the wing/body junction 105 to offset the increase in cross-sectional area that occurs in this region because of the wings.

The configuration of the conventional high-speed transport aircraft 100 shown in FIGS. 1A-C has a number of shortcomings. One shortcoming is the overall size of the aircraft 100 resulting from the rather elongate swept wings 104 extending from the equally elongate fuselage 102. Not only does this size contribute to excessive weight (and hence drag, as discussed above), it also increases the area required to maneuver and park the aircraft 100 during ground servicing.

Another shortcoming associated with the aircraft 100 is the dispersed weight distribution resulting from such a wing/body/tail configuration. This weight distribution requires a substantial airframe to withstand the relatively high maneuver loads encountered during flight. In addition, this weight distribution creates substantial moments of inertia about the pitch, roll, and yaw axes of the aircraft 100. As a result, substantial control forces are required to control movement of the aircraft 100 about these axes, and substantial trim forces are required to trim the aircraft 100 to counteract the larger center of gravity (CG) movements often associated with such configurations. High control/trim forces and high airframe weight result in high drag, which in turn results in increased fuel consumption. In addition, high airframe weight can also result in high landing fees because, at many airports, landing fees are based on aircraft weight.

Further shortcomings of the aircraft configuration shown in FIGS. 1A-C are associated with the waisted portion of the fuselage 102 adjacent to the wing/body junction 105. Typically, the main load-carrying structure of the wings 104 extends through the fuselage 102 at the wing/body junction 105, thereby precluding the storage of cargo in this region. As a result, cargo is typically stored in the fuselage 102 in two or more cargo holds positioned fore and aft of the wing/body junction 105 in a "dumbbell" arrangement. Not only does such an arrangement further compound the unfavorable weight distribution of the aircraft 100, it also dictates multiple points of entry into the fuselage 102 for loading and unloading cargo. Accessing two separate points of entry in this manner accounts for much of the time it takes ground crews to service the aircraft 100. A further consequence of the waisted portion of the fuselage 102 adjacent to the wing/body junction 105 is the necessary reduction in passenger seats in this region. For example, as best seen in FIG. 1C, directly aft of the wing/body junction 105, the fuselage 102 can accommodate about nine passenger seats abreast. In the waisted portion of the fuselage 102 directly adjacent to the wing/body junction 105, however, the fuselage 102 can accommodate only about six passenger seats abreast. In sum, the payload capability, structural efficiency, and ground-servicing aspects of conventional high-speed aircraft configurations, such as that shown in FIGS. 1A-C, are often compromised in an effort to reduce their drag at high speeds.

SUMMARY

The present invention is directed toward high-speed aircraft and methods for their manufacture. In one embodiment, a high-speed aircraft includes a fuselage, a wing, and a passenger cabin. The fuselage has a longitudinal axis, a forward portion, and an aft portion, the aft portion defining a generally constant-width planform. The wing extends from the aft portion of the fuselage and has an upper surface, a lower surface, a forward region with a leading edge, and an aft region with a trailing edge. The passenger cabin is positioned within the aft portion of the fuselage, and has first, second, third, and fourth passenger seat sections, with each of the first, second, third, and fourth seat sections having at least two passenger seats abreast. Further, the first, second, third, and fourth passenger seat sections are spaced apart from each other to form first, second, and third passenger aisles positioned at least generally parallel to the longitudinal axis of the fuselage in an alternating seat section—aisle—seat section pattern.

In one aspect of this embodiment, the aircraft includes a propulsion system at least proximate to the aft region of the wing, with at least part of the propulsion system positioned between the upper and lower surfaces of the wing. The propulsion system has at least one inlet aperture positioned beneath the wing lower surface or above the wing upper surface, at least one engine positioned aft of and vertically offset from the at least one inlet aperture, and at least one exhaust nozzle aft of the at least one engine.

In another embodiment, a method for manufacturing an aircraft includes attaching a wing to a fuselage, positioning a passenger cabin within an aft portion of the fuselage, and coupling a propulsion system at least proximate to an aft region of the wing. In one aspect of this embodiment, attaching the wing to the fuselage includes mounting the wing adjacent to an aft portion of the fuselage, the aft portion of the fuselage defining a generally constant-width planform. In another aspect of this embodiment, positioning the passenger cabin within the aft portion of the fuselage includes positioning first, second, third, and fourth passenger seat sections in the aft portion of the fuselage, with each of the first, second, third, and fourth seat sections having at least two passenger seats abreast positioned at least generally normal to a longitudinal axis of the fuselage. The first, second, third, and fourth passenger seat sections are spaced apart from each other to form first, second, and third passenger aisles positioned at least generally parallel to the longitudinal axis of the fuselage in an alternating seat section—aisle—seat section pattern.

In yet another aspect of this embodiment, coupling a propulsion system at least proximate to the aft region of the wing includes positioning at least part of the propulsion system between upper and lower surfaces of the wing. The propulsion system having at least one inlet aperture positioned beneath the wing lower surface or above the wing upper surface, at least one engine positioned aft of and vertically offset from the at least one inlet aperture, and at least one exhaust nozzle aft of the at least one engine.

DETAILED DESCRIPTION

The following disclosure describes high-speed aircraft configurations having relatively high payload capacities and offering favorable operating and servicing characteristics. Certain specific details are set forth in the following description and in FIGS. 2A-7 to provide a thorough understanding of various embodiments of the invention. Those of ordinary skill in the relevant art will understand, however, that the present invention may have additional embodiments, and that the invention may be practiced without several of the details described below. In other instances, well-known structures and systems often associated with high-speed aircraft are not shown or described in detail here to avoid unnecessarily obscuring the description of the various embodiments of the invention.

In the figures that follow, identical reference numbers refer to identical or substantially similar elements. To facilitate correlation of any particular element, the most significant digit or digits in a reference number refer to the figure number in which that element is first introduced. For example, element 202 is first introduced and discussed with reference to FIG. 2. Those of ordinary skill in the relevant art will appreciate that the dimensions, angles, and other specifications shown in the figures that follow are merely representative of particular embodiments of the invention, and, as such, other embodiments of the invention can have other specifications without departing from the spirit or scope of the present disclosure.

Figure 2A:
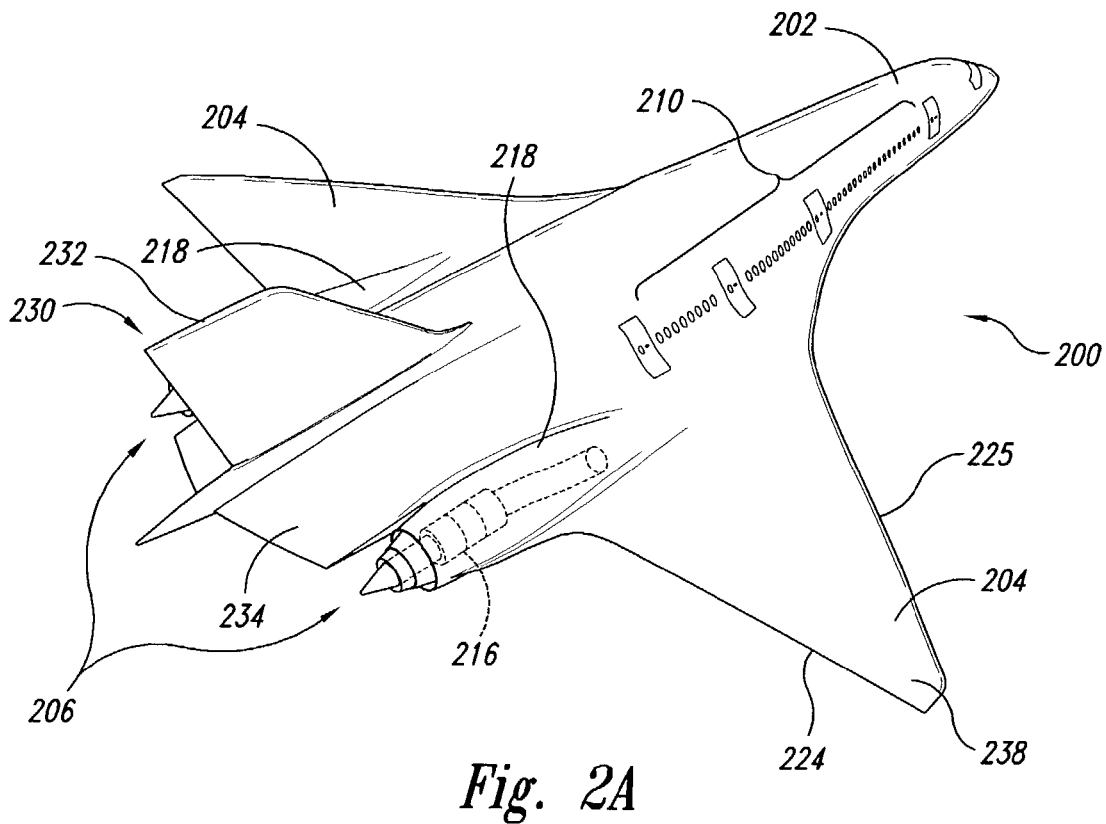
FIG. 2A is a top rear isometric view and FIG. 2B is a bottom side isometric view of a high-speed transport aircraft having a configuration in accordance with an embodiment of the invention.
Figure 2B:
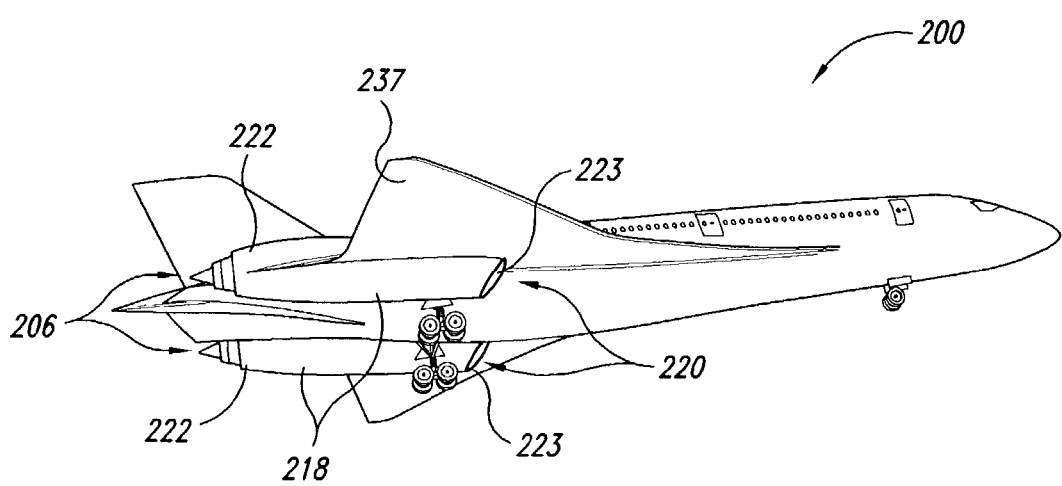

FIG. 2A is a top rear isometric view and FIG. 2B is a bottom side isometric view of a high-speed aircraft 200 having a configuration in accordance with an embodiment of the invention. In one embodiment, the aircraft 200 includes a fuselage 202, delta wings 204 extending outwardly from the fuselage 202, and windows 210 positioned in the fuselage 202 above the wings 204. In one aspect of this embodiment that will be explained in greater detail below, the fuselage 202 has an aft portion defining a generally constant-width planform adjacent to the wings 204. The constant-width aft portion of the fuselage 202 includes a passenger cabin having four passenger seat sections separated from each other by three passenger aisles, with each of the passenger seat sections having at least two passenger seats abreast. In a further aspect of this embodiment that will also be explained in greater detail below, the windows 210 are positioned in the fuselage 202 directly adjacent the passenger seat sections to provide visual access to the windows 210 from within the passenger cabin.

Referring to FIG. 2A, in the illustrated embodiment the aircraft 200 includes a propulsion system 206 and a tail portion 230. In one aspect of this embodiment, the tail portion 230 includes a vertical tail 232 and a horizontal tail 234. The vertical tail 232 can provide yaw control of the aircraft 200, and the horizontal tail 234 can provide pitch control of the aircraft 200. As will be understood by those of ordinary skill in the relevant art, the illustrated arrangement of the horizontal and vertical tails 234 and 232, respectively, represents only one of many possible control surface arrangements for controlling pitch and yaw of the aircraft 200. Accordingly, as will be discussed in greater detail below, other embodiments can utilize other control surface arrangements for controlling pitch and yaw of the aircraft 200 consistent with this disclosure.

Referring now to FIGS. 2A and 2B together, the propulsion system 206 can include engines 216 substantially enclosed within relatively long nacelles 218. In one aspect of this embodiment, each nacelle 218 can include an inlet 220 having an inlet aperture 223 positioned below a lower surface 237 of the wing 204 for directing air to the engine 216. In a further aspect of this embodiment, the nacelles 218 can include exhaust ducts or nozzles 222 positioned aft of trailing edge 224 of the wing 204 near or slightly above a chordline of the wing 204. Accordingly, in the illustrated embodiment, at least a portion of the propulsion system 206 is positioned between an upper surface 238 of the wing 204 and the lower surface 237 of the wing 204.

In other embodiments, various aspects of the propulsion system 206 may differ from those illustrated in FIGS. 2A and 2B without departing from the spirit or scope of the present disclosure. For example, in one other embodiment the inlet 220 can be positioned above the upper surface 238 of the wing 204 instead of below the lower surface 237. In another embodiment, the nacelles 218 can extend from an aft portion of the fuselage 202 instead of extending from the wings 204. In yet other embodiments, the nacelles 218 can be suspended as pods below the wings 204 either proximate a leading edge 225 or the trailing edge 224. In still other embodiments, the nacelles 218 can be integrated with the lower surface 237 of the wing 204 to position the engines 216 and the nacelles 218 below the wing 204. And in still other embodiments, the nacelles 218 can be supported as pods above the wing 204.

In one embodiment, the aircraft 200 can be configured to transport about 250 passengers and their luggage at a cruise Mach number of between about 0.80 and about 0.98. In another embodiment, the aircraft 200 can be configured to transport about 250 passengers and their luggage at a cruise Mach number of between about 0.90 and about 0.96. In other embodiments, the aircraft 200 can be configured to transport other payloads at other Mach numbers. For example, in one other embodiment the aircraft 200 can be configured to transport about 200 passengers and their luggage at Mach numbers ranging from about 1.5 to about 3.0. In yet other embodiments, the aircraft 200 can be configured to transport mainly cargo at Mach numbers ranging from about 0.70 to about 0.86.

Figure 3:
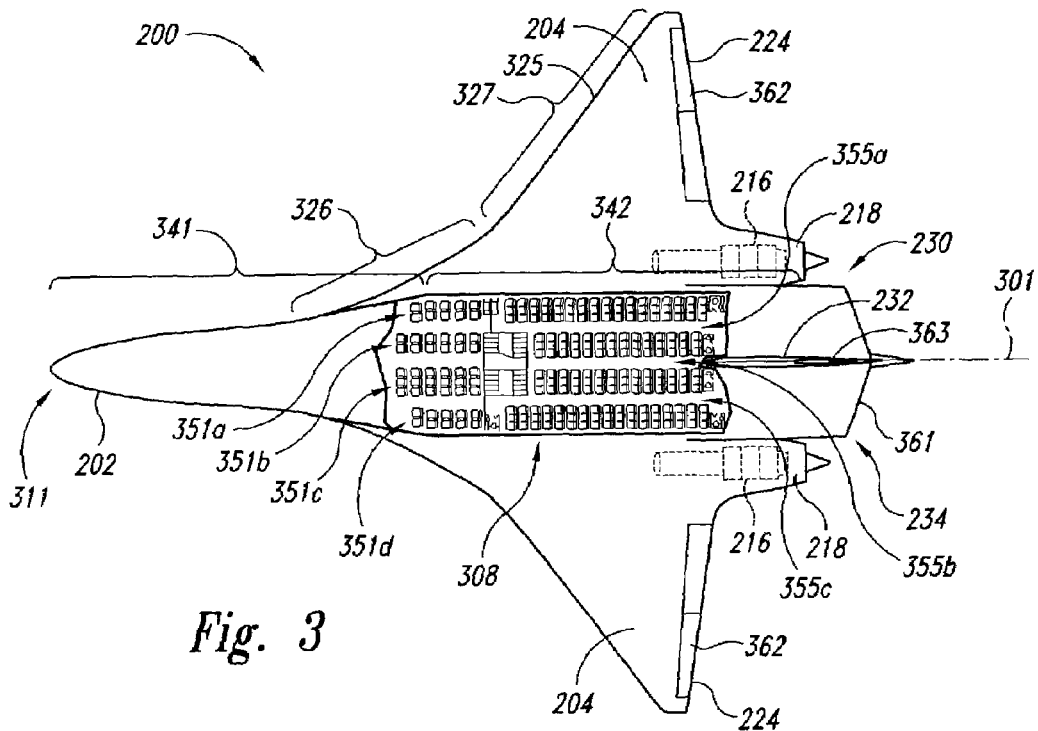
FIG. 3 is a partially cut-away top view of the aircraft shown in FIGS. 2A and 2B in accordance with an embodiment of the invention.

FIG. 3 is a partially cut-away top view of the aircraft 200 in accordance with an embodiment of the invention. In one aspect of this embodiment, the fuselage 202 extends along a longitudinal axis 301 and includes a forward portion 341 and an aft portion 342. The forward portion 341 of the illustrated embodiment has a generally continuously monotonically tapering planform extending forward from the aft portion 342 to a nose end 311, and the aft portion 342 has a generally constant-width planform extending aft from the forward portion 341 to the tail portion 230. In other embodiments, the fuselage 202 can have other planforms. For example, in one other embodiment the forward portion 341 can have a non-monotonically tapering planform extending forward from the aft portion 342 to the nose end 311. In another embodiment, the forward portion 341 can have a generally constant-width cross section extending forward from the aft portion 342 and culminating in a rounded shape at the nose end 311. In yet other embodiments, the fuselage 202 can have still other planforms.

The wings 204 extend from the fuselage 202 adjacent to the aft portion 342. In one aspect of this embodiment, the wings 204 have moderate "double delta" planforms, including a leading edge 325 having a first part 326 proximate to the fuselage 202 extending at a first aft sweep angle and a second part 327 outboard of the first part 326 extending at a second aft sweep angle shallower than the first aft sweep angle. In a further aspect of this embodiment, the trailing edge 224 of the wing 204 extends outwardly proximate to the nacelle 218 at a shallow forward sweep angle. In other embodiments, the wings 204 can have other planforms consistent with this disclosure. For example, in one other embodiment the wings 204 can have delta planforms with leading edges 325 extending at a single aft sweep angle away from the fuselage 202. In yet other embodiments, the trailing edge 224 can extend outwardly proximate to the nacelle 218 in a shallow aft sweep angle to give the wings 204 slightly aft-swept delta planforms. In yet other embodiments, the wing can have other planforms.

The aircraft 200 includes a number of movable control surfaces for controlling motion of the aircraft along the pitch, roll, and yaw axes. For example, the horizontal tail 234 can include a first control surface 361 (e.g., an elevator) for controlling pitch of the aircraft 200, the wings 204 can include second control surfaces 362 (e.g., ailerons) for controlling roll of the aircraft 200, and the vertical tail 232 can include a third control surface 363 (e.g., a rudder) for controlling yaw of the aircraft 200. The foregoing description of the first, second, and third control surfaces 361, 362, and 363 represents only one possible embodiment in accordance with the invention, and those of ordinary skill in the relevant art will appreciate that other control surface arrangements are possible. For example, in one alternate embodiment, elevons could be mounted proximate to the trailing edge 224 of the wing 204 to control both pitch and roll of the aircraft 200. In yet other embodiments, two or more vertical or near-vertical tail surfaces can be mounted proximate to the tail portion 230, the nacelles 218, or the tips of the wings 204 to control yaw of the aircraft 200.

In an embodiment illustrated in FIG. 3, the aircraft 200 has a length of about 191 feet, a wing span of about 155 feet, a passenger cabin width of about 29 feet, an effective wing area of about 6780 square feet, a wing aspect ratio of about 3.45, and a wetted area aspect ratio of about 1.1. As will be appreciated by those of ordinary skill in the relevant art, these specifications are merely representative of one embodiment of the invention. Accordingly, in other embodiments, the aircraft can have other specifications. For example, in one other embodiment, the aircraft length can be about 210 feet, the wing span can be about 180 feet, and the specifications of wing area, wing aspect ratio, and wetted area aspect ratio will change accordingly.

In one embodiment, the fuselage 202 includes a passenger cabin 308 having passenger seat sections 351 (shown as a first seat section 351a, a second seat section 351b, a third seat section 351c, and a fourth seat section 351d). Each of the seat sections 351a-d is positioned generally parallel to the longitudinal axis 301 of the fuselage 202 and is offset from the others to create aisles 355 (shown as a first aisle 355a, a second aisle 355b, and a third aisle 355c). Accordingly, the aisles 355 are configured to allow passenger travel between the respective seat sections 351. In the illustrated embodiment, each of the seat sections 351a-d includes at least 54 passenger seats. In addition, each of the seat sections 351a-d includes a portion having three seats abreast and extending for at least 14 contiguous rows. In a further aspect of this embodiment, the passenger cabin 308 can accommodate about 236 passengers or more. In other embodiments, the passenger cabin 308 can accommodate more or fewer passengers in different seating arrangements without departing from the spirit or scope of the present invention. For example, in alternate embodiments the passenger cabin 308 can be configured to predominately carry cargo, resulting in a relative absence of passenger seats in the passenger cabin 308.

As discussed above with reference to FIG. 2A, a portion of the windows 210 are positioned directly adjacent to the first and fourth seat sections 351a and 351d to provide passengers with a view out of the aircraft 200. In one aspect of this embodiment, the passenger cabin 308 is devoid of any structural members extending vertically between the seat sections 351 that would partition the passenger cabin 308 and prevent a clear line of sight across the passenger cabin 308 from, for example, the first seat section 351a to the fourth seat section 351d. Accordingly, the passenger cabin 308 provides an open space or volume directly above the seat sections 351 providing passengers (not shown) with a unobstructed line of sight across the passenger cabin 308 toward the various windows 210. In other embodiments, the passenger cabin 308 can include one or more vertical partitions or structural members extending between the passenger seat sections 351 for structural, aesthetic, acoustic, or other reasons as the particular application may dictate. These partitions can include optional openings to allow passengers in seat sections 351b-c at least some visual access to the windows 210. These partitions can also include structural members (e.g., struts) extending vertically across the inside of the fuselage 202 for structural purposes.

Figure 4:
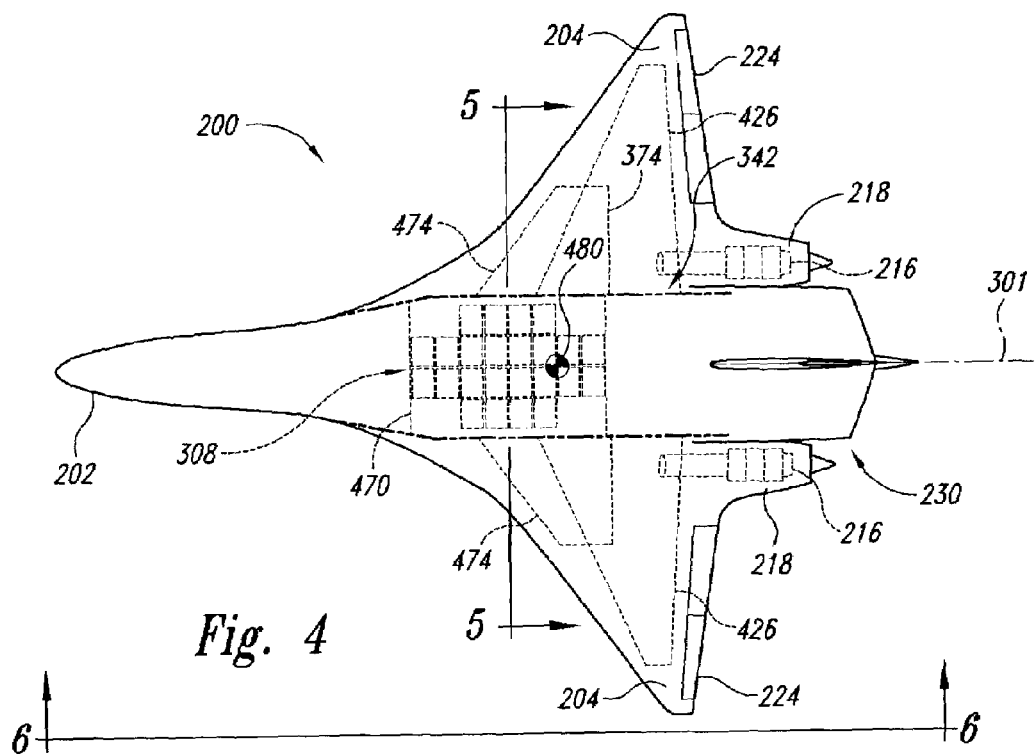
FIG. 4 is a partially hidden top view similar to FIG. 3 of the aircraft shown in FIGS. 2A and 2B in accordance with an embodiment of the invention.

FIG. 4 is a partially hidden top view of the aircraft 200 in accordance with an embodiment of the invention. FIG. 4 is substantially similar to FIG. 3, but the passenger seat sections 351 have been removed for ease of reference in regard to the discussion that follows. In the illustrated embodiment, the aircraft 200 includes a cargo hold 470 positioned in the fuselage 202, fuel volumes 474 positioned in the wings 204, and a center of gravity (CG) 480 positioned along the longitudinal axis 301 of the fuselage 202. In one aspect of this embodiment, the cargo hold 470 can have a width greater than about 10 feet and a length greater than about 25 feet. For example, in the illustrated embodiment, the cargo hold 470 has a width of about 29 feet and a length of about 42 feet. In other embodiments, the cargo hold 470 can have other dimensions. For example, in other embodiments the cargo hold can have a length greater than about 20 percent of the fuselage length and a width greater than about 18 percent of the wing span.

In another aspect of this embodiment, the CG 480 is the theoretical point through which the resultant of the combined weights of the components of the aircraft 200 acts. In the illustrated embodiment, the CG 480 can be positioned along the longitudinal axis 301 of the fuselage 202 adjacent to about 40 to 50 percent of the mean aerodynamic cord (MAC) (not shown) of the wings 204. For example, the CG can be positioned along the longitudinal axis 301 of the fuselage 202 adjacent to about 46 percent of the MAC. In other embodiments, the CG 480 can be positioned at other locations along the longitudinal axis 301. In another aspect of this embodiment, the cargo hold 470 is positioned within the aft portion 342 of the fuselage 202 circumscribing the CG 480. Similarly, the fuel volumes 474 are positioned within the wings 204 laterally adjacent to the CG 480 and somewhat forward of wing box structures 426. The wing box structures 426 are the main structural members that carry the principal loads on the wings 204.

In yet another aspect of this embodiment, any rotating components of the engines 216 (e.g., fan blades, compressor blades, and turbine blades) can be positioned aft of the passenger cabin 308 and the fuel volumes 474. Positioning the rotating components of the engines 216 aft of the passenger cabin 308 in this manner can reduce the likelihood of depressurization of the passenger cabin 308 should one of the rotating components fail. In addition, positioning the rotating components of the engines 216 aft of the fuel volumes 474 can reduce the likelihood of a fire should one of the rotating components fail.

Figure 5:
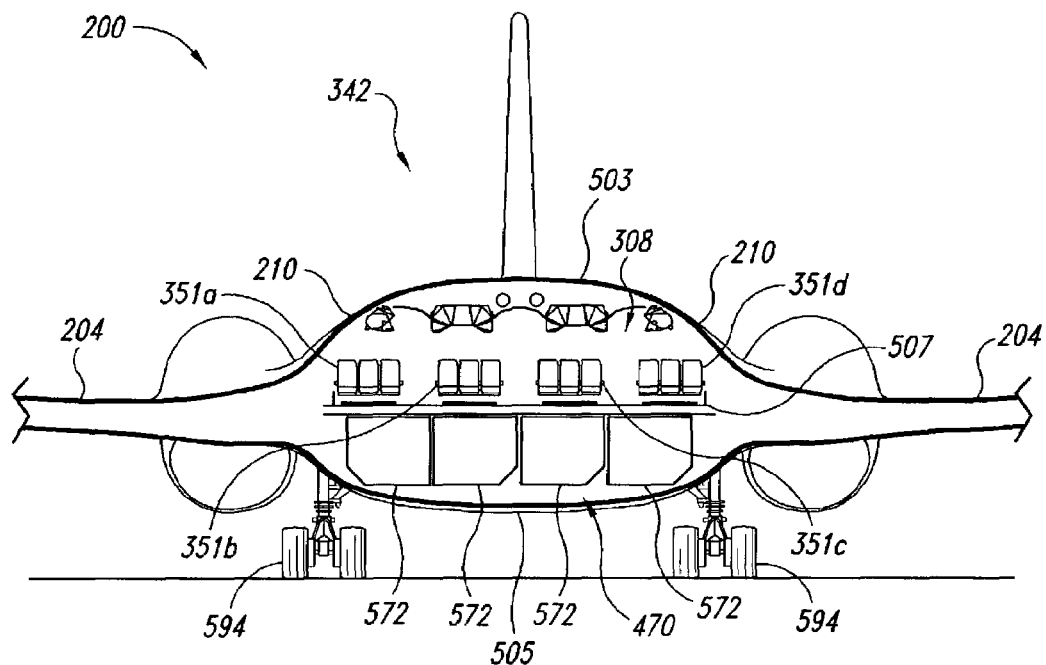
FIG. 5 is a front cross-sectional elevational view of the aircraft shown in FIGS. 2A and 2B in accordance with an embodiment of the invention taken substantially along line 5-5 in FIG. 4.

FIG. 5 is a front cross-sectional elevational view of the aircraft 200 in accordance with an embodiment of the invention, taken substantially along line 55 in FIG. 4. The aircraft 200 illustrated in FIG. 5 is in a parked configuration, and, as will be discussed in greater detail below, is partially supported on two retractable main gears 594 spaced apart from each other and extending downwardly from the wings 204. In one aspect of this embodiment, the aft portion 342 of the fuselage 202 has a generally oval cross-sectional shape with a horizontal floor 507 separating the passenger cabin 308 from the cargo hold 470. The cargo hold 470 is configured to accommodate a plurality of standard cargo containers 572. In one aspect of this embodiment, the standard cargo containers 572 are Unit Load Device LD-3 cargo containers, and the cargo hold 470 can accommodate at least twelve of these containers positioned four abreast. In other embodiments, the cargo hold 470 can be configured to accommodate other types of cargo, such as luggage, mail, etc.

In a further aspect of this embodiment, the fuselage 202 includes an upper surface 503 spaced apart from a lower surface 505. The wings 204 extend outwardly from the fuselage 202 adjacent to the aft portion 342 in the space between the upper surface 503 and the lower surface 505. As discussed above, windows 210 positioned in the upper surface 503 of the fuselage 202 directly adjacent to the first seat section 351 and the fourth seat section 354. As can be seen in the illustrated embodiment, the passenger cabin 308 is devoid of any load-bearing member extending upwardly from the floor 507 toward the upper surface 503 forming partitions in the passenger cabin 308. Accordingly, passengers (not shown) seated in any of the seat sections 351-354 are afforded an unobstructed line of sight across the full expanse of the passenger cabin 308. In other embodiments as mentioned above, one or more structural members (not shown) can extend vertically across the cargo hold 470 and/or the passenger cabin 308 for structural or other purposes.

Figure 6:
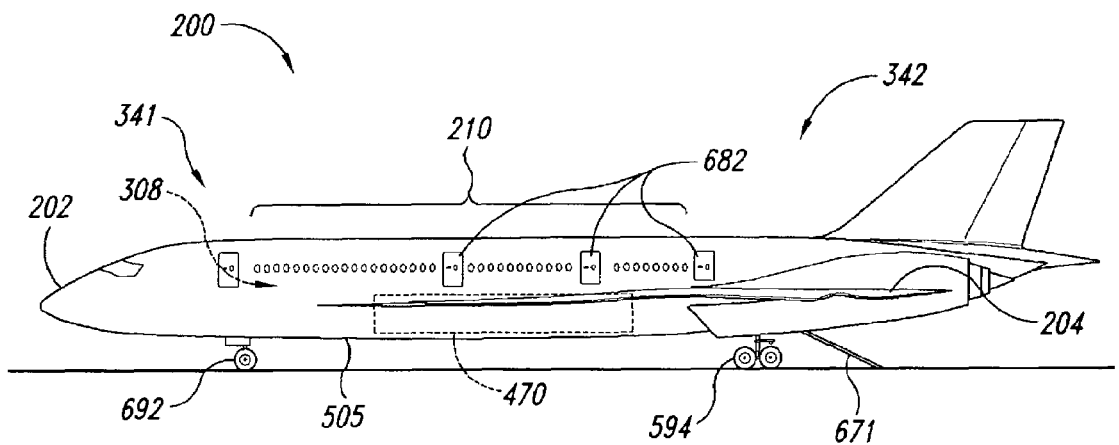
FIG. 6 is a side elevational view of the aircraft shown in FIGS. 2A and 2B in accordance with an embodiment of the invention taken substantially along line 6-6 in FIG. 4.

FIG. 6 is a side elevational view of the aircraft 200 taken substantially along line 6-6 in FIG. 4 in accordance with an embodiment of the invention. In one aspect of this embodiment, the fuselage 202 includes over-wing passenger egress doors 682 positioned adjacent to the windows 210 slightly above the wings 204. The doors 682 provide passengers within the passenger cabin 308 with easy access to an emergency exit in the unlikely event such a need arises.

The fuselage 200 is supported on a retractable nose gear 692 extending downwardly from the forward portion 341 of the fuselage 202, in addition to the two spaced-apart main gears 594. In a further aspect of this embodiment, the aircraft 200 includes a single ventral cargo door 671 operably integrated with the lower surface 505 of the aft portion 342 of the fuselage 202 aft of the cargo hold 470. The cargo door 671 is aligned with the longitudinal axis 301 (FIG. 3) of the fuselage 202 and is positioned in the space between the two main gears 594. The cargo door 671 is illustrated in FIG. 6 in an opened configuration suitable for loading and unloading cargo from the cargo hold 470. Accordingly, the cargo door 671 is pivotally rotated upwardly toward the fuselage 202 to close the cargo door flush with the lower surface 505 in preparation for takeoff of the aircraft 200. As mentioned above, having a single cargo door 671 (in contrast to two cargo doors as typically found on conventional high-speed transport aircraft) expedites the loading and unloading of cargo into the aircraft 200 during ground servicing.

Figure 1A:
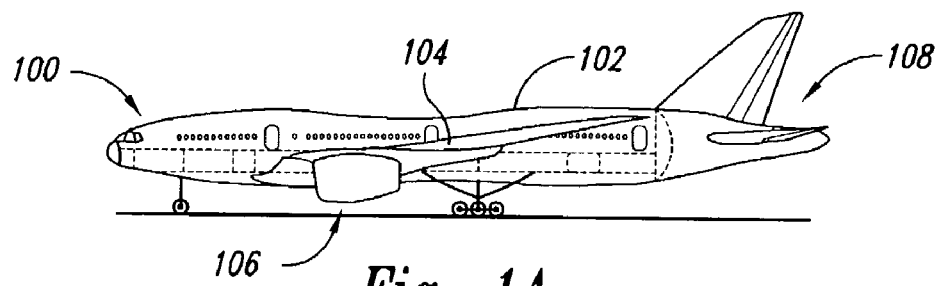
FIGS. 1A-C illustrate a high-speed transport aircraft having a waisted fuselage in accordance with the prior art.
Figure 1B:
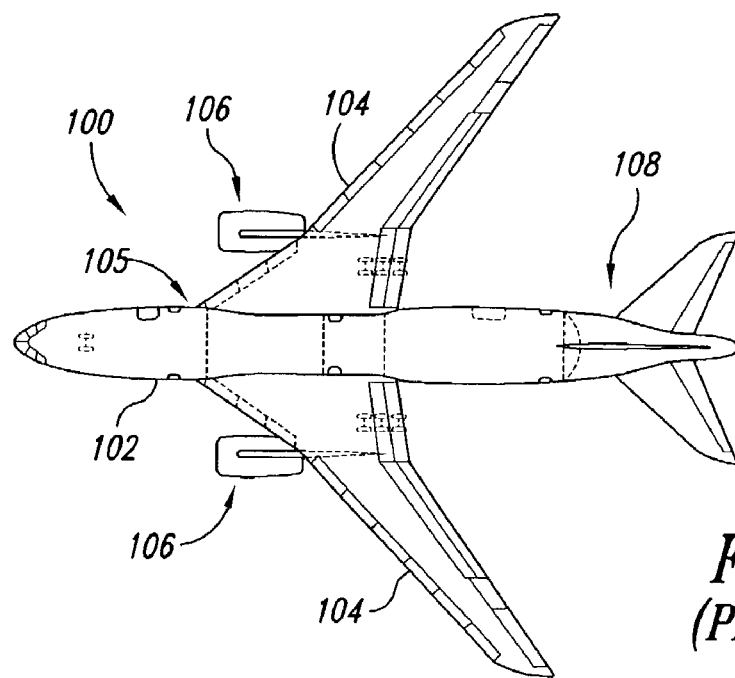
Figure 1C:
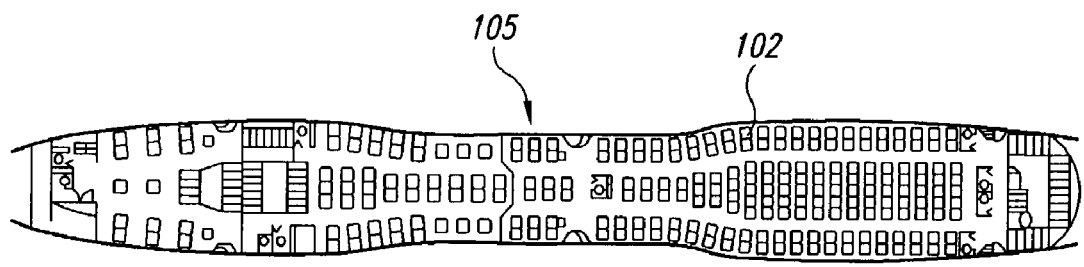

Embodiments of the aircraft 200 have a number of advantages over conventional high-speed transport aircraft, such as the prior art aircraft 100 shown in FIGS. 1A-C. For example, as illustrated in FIG. 3, in one embodiment the aircraft 200 can provide the four passenger seat sections 351-354 and the three passenger aisles 355-357 in the constant-width aft portion 342 of the fuselage 202 adjacent to the wings 204. This feature enables the aircraft 200 to carry about 250 passengers while still maintaining a relatively compact, low-drag configuration. In contrast, conventional transport aircraft typically have a waisted fuselage portion adjacent to the wing/body junction in an effort to reduce wave drag in accordance with the area rule. Use of such a waisted fuselage portion can result in a fuselage that is less efficient structurally than the fuselage 202 of the aircraft 200.

One benefit of embodiments of the aircraft 200 is that any drag penalty associated with the constant-width aft portion 342 of the fuselage 202 is offset by other drag reductions realized because of the compactness of the configuration. For example, the compact nature of the delta or double-delta wings 204 extending from the fuselage 202 at a mid-body waterline allows easy blending of the wings 204 with the integrated nacelles 218, the fuselage 202, and the tail portion 230 to create a structurally efficient and lightweight airframe. This low weight results in relatively low induced drag, and the compact and blended components result in relatively low skin friction and pressure drag. The blended/integrated configuration of the various components of the aircraft 200 (such as the nacelles 218) can also result in relatively low wave drag, as will be explained in greater detail below in reference to FIG. 7. Thus, the compact airframe, low structural weight, and wave drag reductions resulting from the blended configuration are three drag-reducing features of the aircraft 200 that tend to offset any drag increase that may be associated with the constant-width aft portion 342 of the fuselage 202.

Another advantage associated with embodiments of the aircraft 200 is the position of the cargo hold 470 and the fuel volumes 474 relative to the CG 480. Positioning the cargo hold 470 and the fuel volumes 474 at or near the CG 480 results in relatively low flight loads on the airframe of the aircraft 200, and also reduces the moments of inertia of the aircraft 200. Lower moments of inertia require lower control forces for flight maneuvers. In addition, positioning the fuel volumes 474 at or near the CG 480 means that as fuel contained within the fuel volumes 474 is consumed by the engines 216, the CG 480 will not migrate appreciably. In one embodiment, the CG 480 can be positioned within the cargo hold 470 at all times, that is, when the fuel volumes 474 are both full and empty. As a result, only moderate trim settings will be required to counteract imbalances resulting from migration of the CG 480. Relatively low flight loads, control forces, and trim settings all contribute to low airframe structural weight, which accordingly results in increased fuel efficiency.

Yet another advantage associated with embodiments of the aircraft 200 is ease of ground servicing. For example, the compact and lightweight configuration of the aircraft 200 facilitates ground maneuvers of the aircraft 200 during parking or servicing. In addition, having a single cargo hold such as the cargo hold 470 means that service time on the ground for loading and/or unloading cargo can be minimized because only one cargo door needs to be accessed.

Figure 7:
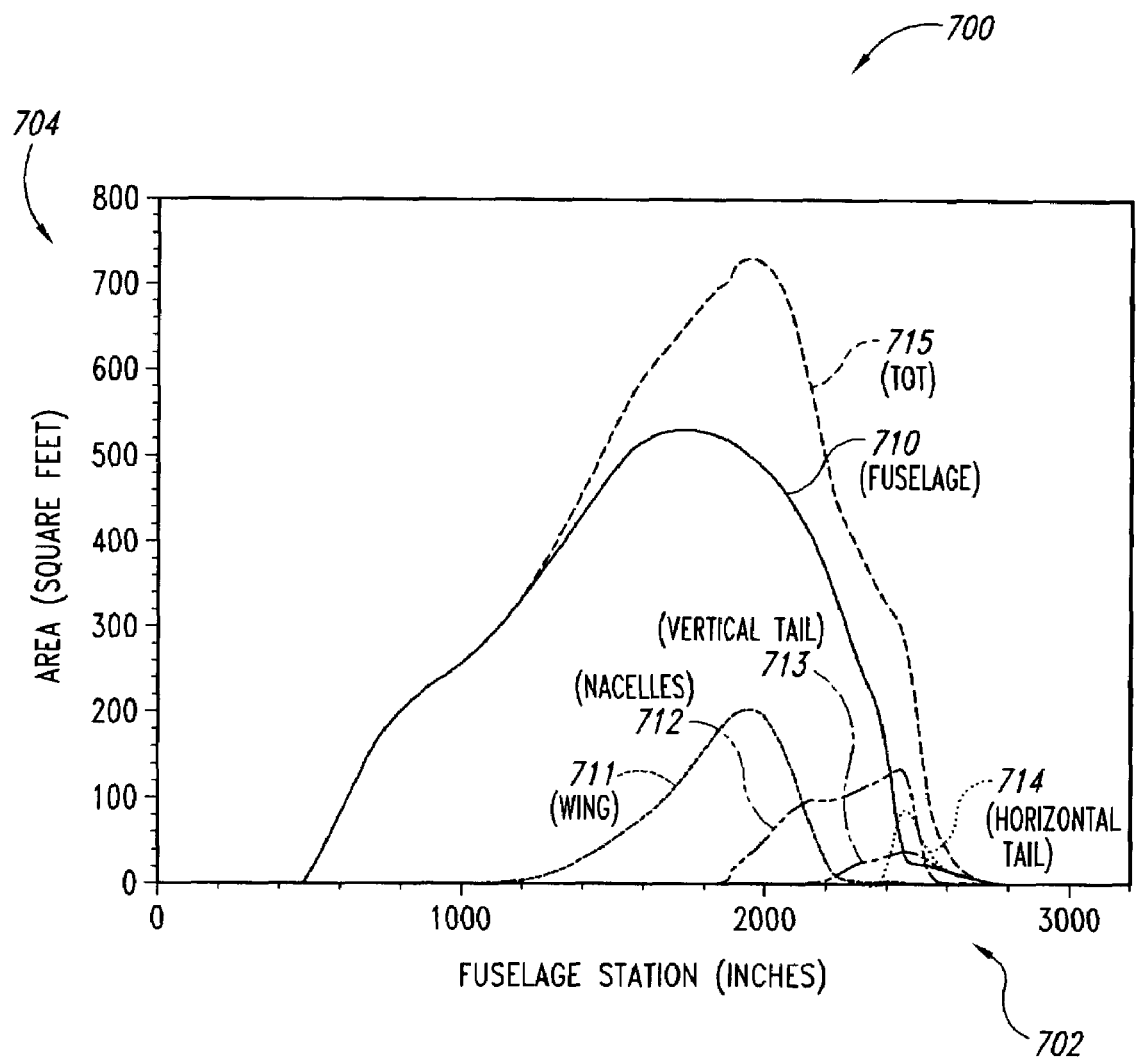
FIG. 7 is a graph illustrating a cross-sectional area distribution for the aircraft shown in FIGS. 2A and 2B in accordance with an embodiment of the invention.

FIG. 7 is a graph 700 illustrating a cross-sectional area distribution for an embodiment of the aircraft 200 described above and shown in FIGS. 2A-6. In one aspect of this embodiment, the fuselage station along the longitudinal axis 301 is shown on a horizontal axis 702, and corresponding cross-sectional areas for the various components of the aircraft 200 (described above with reference to FIGS. 2A-6) are shown on a vertical axis 704. Specifically, a line 710 shows the longitudinal distribution of the cross-sectional area of the fuselage 202, a line 711 shows the longitudinal distribution of the cross-sectional area of the wings 204, a line 712 shows the longitudinal distribution of the cross-sectional area of the nacelles 218, a line 713 shows the longitudinal distribution of the cross-sectional area of the vertical tail 232, a line 714 shows the longitudinal distribution of the cross-sectional area of the horizontal tail 234, and a line 715 shows the longitudinal distribution of the total cross-sectional area of the aircraft 200.

As discussed above, one advantage of embodiments of the aircraft 200 is the reduction in wave drag that results from blending or integrating various components to provide a favorable cross-sectional area distribution. For example, referring to FIGS. 2A-6 together with FIG. 7, the position of the nacelles 218 on the aircraft 200 can reduce wave drag in accordance with the area rule, which holds that the wave drag is minimized if the distribution of cross-sectional area along the longitudinal axis is a smooth function (e.g., a normal distribution) having the maximum possible fineness ratio. Accordingly, integrating the nacelles 218 into the wings 204 reduces the contribution of the nacelles 218 to the total cross-sectional area of the aircraft 200 adjacent to the wing/body junction—where the cross-sectional area is greatest—thereby minimizing the increase in the cross-sectional area distribution that typically occurs in this region. Further, extending the nacelles 218 well aft of the trailing edges 224 of the wings 204 smoothes out the total cross-sectional area distribution toward the tail portion 230, minimizing the rapid decrease in the cross-sectional area distribution that typically occurs in this region. Thus, the integrated nacelles 218 are one drag-reducing feature of the aircraft 200 that tends to offset a drag increase that may be associated with the constant-width aft portion 342 of the fuselage 202.

Although specific embodiments of, and examples for, the present invention are described here for illustrative purposes, various modifications can be made without departing from the spirit or scope of the present invention. Therefore, the terms used in the following claims should not be construed to limit the invention to the specific embodiments disclosed, but in general should be construed to include all aircraft configurations in accordance with the claims. Accordingly, the invention is not limited by this disclosure, but instead its scope is to be determined entirely by the following claims.

We claim:

1. An aircraft comprising:
   a fuselage configured to carry a payload and having a longitudinal axis, the fuselage having a forward portion and an aft portion, the aft portion defining a generally constant-width planform;
   a wing extending from the fuselage adjacent to the aft portion of the fuselage, wherein the wing has an upper surface, a lower surface, a forward region with a leading edge, and an aft region with a trailing edge;
   a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage; and a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine.

2. The aircraft of claim 1 wherein each of the first, second, third, and fourth seat sections includes at least 54 passenger seats.

3. An aircraft comprising:
a fuselage configured to carry a payload and having a longitudinal axis, the fuselage having a forward portion and an aft portion, the aft portion defining a generally constant-width planform;
a wing extending from the fuselage adjacent to the aft portion of the fuselage; and
a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage, wherein each of the first, second, third, and fourth passenger seat sections includes a portion having three seats abreast and extending for at least 14 contiguous rows.

4. An aircraft comprising:
a fuselage configured to carry a payload and having a longitudinal axis, the fuselage having a forward portion and an aft portion, the aft portion defining a generally constant-width planform;
a wing extending from the fuselage adjacent to the aft portion of the fuselage, wherein the wing has an upper surface, a lower surface, a forward region with a leading edge, and an aft region with a trailing edge;
a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage; and
a propulsion system at least proximate to the aft region of the wing, with at least part of the propulsion system positioned between the upper and lower surfaces of the wing, the propulsion system having at least one inlet aperture, positioned beneath the wing lower surface or above the wing upper surface, at least one engine positioned aft of and vertically offset from the at least one inlet aperture, and at least one exhaust nozzle aft of the at least one engine, wherein the wing and the propulsion system are configured to operate at a cruise Mach number ranging from about 0.80 to about 0.98.

5. The aircraft of claim 4 wherein the wing and the propulsion system are configured to operate at a cruise Mach number ranging from about 0.90 to about 0.96.

6. The aircraft of claim 1 wherein the fuselage is configured to carry a commercial passenger payload of at least 230 passengers and/or a commercial cargo payload.

7. The aircraft of claim 1 wherein the wing has a delta planform.

8. The aircraft of claim 1 wherein the wing has a forward region with a leading edge, the leading edge having a first part proximate to the fuselage with a first sweep angle and a second part outboard of the first part with a second sweep angle less than the first sweep angle.

9. The aircraft of claim 1 further comprising:
a cargo hold positioned within the aft portion of the fuselage; and
a center of gravity through which the resultant of the gravitational forces on all components of the aircraft acts, the center of gravity having a position within the cargo hold.

10. The aircraft of claim 1 further comprising:
a cargo hold positioned within the aft portion of the fuselage;
a fuel volume positioned within the wing and configured to carry fuel; and
a center of gravity through which the resultant of the gravitational forces on all components of the aircraft acts, the center of gravity having a first position when the fuel volume is approximately full of fuel and a second position when the fuel volume is approximately empty of fuel, the first and second positions being located within the cargo hold.

11. The aircraft of claim 1 wherein the aft portion of the fuselage further includes an upper fuselage surface spaced apart from a lower fuselage surface, wherein the wing extends from the fuselage between the upper and lower fuselage surfaces adjacent to the aft portion of the fuselage, and wherein the aircraft further comprises:
at least a first window positioned in the upper fuselage surface directly adjacent the first passenger seat section; and
at least a second window positioned in the upper fuselage surface directly adjacent the fourth passenger seat section.

12. The aircraft of claim 1 wherein the fuselage includes first windows adjacent the first passenger seat section and second windows adjacent the fourth passenger seat section, and wherein each of the seats in the first, second, third, and fourth passenger seat sections has visual access to at least one of the first windows and at least one of the second windows.

13. The aircraft of claim 3 wherein the aft portion of the fuselage includes an upper interior surface spaced apart from a lower interior surface, wherein the passenger cabin is absent any load-bearing member extending vertically between the lower interior surface and the upper interior surface between the seat sections.

14. The aircraft of claim 1 wherein the aft portion of the fuselage includes an upper fuselage surface spaced apart from a lower fuselage surface, wherein the aft portion of the fuselage further includes a cargo hold and a cargo door configured to facilitate loading of cargo into the cargo hold, the cargo door being operably integrated with the lower surface of the aft portion of the fuselage along the longitudinal axis of the fuselage.

15. The aircraft of claim 1 further comprising a generally horizontal and moveable elevator surface adjacent to the aft portion of the fuselage.

16. An aircraft comprising:
a fuselage configured to carry a payload and having a longitudinal axis, the fuselage having a forward portion and an aft portion, the aft portion defining a generally constant-width planform;
a wing extending from the fuselage adjacent to the aft portion of the fuselage, wherein the wing has an upper surface, a lower surface, a forward region with a leading edge, and an aft region with a trailing edge;

a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage;

a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine;

a generally horizontal and moveable first control surface integrated with the fuselage adjacent to the aft portion of the fuselage; and a generally horizontal and moveable second control surface integrated with the aft region of the wing outboard of the at least one engine.

17. The aircraft of claim 3 wherein the aft portion of the fuselage has a generally oval cross-sectional shape and the passenger cabin has a width of between about 25 feet and about 35 feet.

18. The aircraft of claim 3 wherein the wing has a leading edge and a trailing edge, and wherein the aircraft further comprises a moveable elevon surface at the wing trailing edge.

19. The aircraft of claim 1 wherein the fuselage is configured for a military payload.

20. An aircraft comprising:
a fuselage configured to carry a payload and having a longitudinal axis, the fuselage having a forward portion and an aft portion, the aft portion defining a generally constant-width planform;

a wing extending from the fuselage adjacent to the aft portion of the fuselage, wherein the wing has an upper surface, a lower surface, a forward region with a leading edge, and an aft region with a trailing edge;

a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage, wherein the fuselage includes first windows adjacent the first passenger seat section and second windows adjacent the fourth passenger seat section, and wherein each of the seats in the first, second, third, and fourth passenger seat sections provides visual access to at least one of the first windows and at least one of the second windows; and a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine.

21. An aircraft comprising:
a fuselage configured to carry a payload and having a longitudinal axis, the fuselage having a forward portion and an aft portion, the aft portion defining a generally constant-width planform;

a wing extending from the fuselage adjacent to the aft portion of the fuselage;

a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage, wherein the fuselage includes first windows adjacent the first passenger seat section and second windows adjacent the fourth passenger seat section, and wherein each of the seats in the first, second, third, and fourth passenger seat sections provides visual access to at least one of the first windows and at least one of the second windows;

a cargo hold positioned within the aft portion of the fuselage; and a center of gravity through which the resultant of the gravitational forces on all components of the aircraft acts, the center of gravity positioned within the cargo hold.

22. The aircraft of claim 21 wherein the aft portion of the fuselage has an upper interior surface and a lower interior surface and a floor portion extending horizontally between the upper interior surface and the lower interior surface to separate the passenger cabin from the cargo hold, and wherein the passenger cabin is absent any load-bearing member extending vertically between the floor portion and the upper interior surface parallel to the longitudinal axis of the fuselage between the seat sections.

23. The aircraft of claim 21 wherein the aft portion of the fuselage has an upper interior surface and a lower interior surface and a floor portion extending horizontally between the upper interior surface and the lower interior surface to separate the passenger cabin from the cargo hold, and wherein the passenger cabin is absent any load-bearing member extending vertically between the floor portion and the upper interior surface between the seat sections.

24. The aircraft of claim 21 wherein the aft portion of the fuselage has an upper interior surface and a lower interior surface and a floor portion extending horizontally between the upper interior surface and the lower interior surface to separate the passenger cabin from the cargo hold, and wherein the passenger cabin is absent any member extending vertically between the floor portion and the upper interior surface between the seat sections.

25. The aircraft of claim 21 wherein each of the first, second, third, and fourth seat sections includes at least 54 passenger seats.

26. The aircraft of claim 21 wherein each of the first, second, third, and fourth passenger seat sections includes a portion having three seats abreast and extending for at least 14 contiguous rows.

27. The aircraft of claim 21 wherein the wing has an upper surface, a lower surface, a forward region with a leading edge, and an aft region with a trailing edge, wherein the aircraft further comprises a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine, wherein the wing and the propulsion system are configured to operate at a cruise Mach number ranging from about 0.90 to about 0.96.

28. The aircraft of claim 21 wherein the aft portion of the fuselage further includes an upper fuselage surface spaced apart from a lower fuselage surface, wherein the wing extends from the fuselage between the upper and lower fuselage surfaces adjacent to the aft portion of the fuselage, and wherein the aircraft further comprises:
   at least a first window positioned in the upper fuselage surface directly adjacent the first passenger seat section; and
   at least a second window positioned in the upper fuselage surface directly adjacent the fourth passenger seat section.

29. The aircraft of claim 21 wherein the aft portion of the fuselage has a generally oval cross-sectional shape and the passenger cabin has a width of between about 25 feet and about 35 feet.

30. An aircraft comprising:
   a fuselage configured to carry a payload and having a longitudinal axis, the fuselage having a forward portion and an aft portion, the aft portion defining a generally constant-width planform;
   a wing extending from the fuselage adjacent to the aft portion of the fuselage, the wing having a forward region with a leading edge and an aft region with a trailing edge, the wing further having an upper surface and a lower surface;
   a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine; and
   a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage.

31. The aircraft of claim 30 wherein each of the first, second, third, and fourth seat sections includes at least 54 passenger seats.

32. The aircraft of claim 30 wherein each of the first, second, third, and fourth passenger seat sections includes a portion having three seats abreast and extending for at least 14 contiguous rows.

33. The aircraft of claim 30 wherein the wing includes a fuel volume configured to carry fuel for the propulsion system, and wherein the engine includes rotating components, further wherein the rotating components of the engine are positioned aft of the fuel volume.

34. The aircraft of claim 30 wherein the wing includes a fuel volume configured to carry fuel for the propulsion system, and wherein the engine includes rotating components, further wherein the rotating components of the engine are positioned aft of the fuel volume and the passenger cabin.

35. The aircraft of claim 30 wherein the wing and the propulsion system are configured to operate at a cruise Mach number ranging from about 0.90 to about 0.96.

36. The aircraft of claim 30 wherein the leading edge of the wing has a first part proximate to the fuselage with a first sweep angle and a second part outboard of the first part with a second sweep angle less than the first sweep angle.

37. The aircraft of claim 30 wherein the trailing edge of the wing is forward swept.

38. The aircraft of claim 30 further comprising:
   a cargo hold positioned within the aft portion of the fuselage;
   a fuel volume positioned within the wing and configured to carry fuel; and
   a center of gravity through which the resultant of the gravitational forces on all components of the aircraft acts, the center of gravity having a first position when the fuel volume is approximately full of fuel and a second position when the fuel volume is approximately empty of fuel, the first and second positions being located within the cargo hold.

39. The aircraft of claim 30 wherein the aft portion of the fuselage further includes an upper fuselage surface spaced apart from a lower fuselage surface, wherein the wing extends from the fuselage between the upper and lower fuselage surfaces adjacent to the aft portion of the fuselage, and wherein the aircraft further comprises:
   at least a first window positioned in the upper fuselage surface directly adjacent the first passenger seat section; and
   at least a second window positioned in the upper fuselage surface directly adjacent the fourth passenger seat section.

40. The aircraft of claim 30 further comprising a moveable elevator surface adjacent to the aft portion of the fuselage.

41. The aircraft of claim 30 further comprising a moveable elevon surface at the wing trailing edge.

42. The aircraft of claim 30 further comprising:
   a moveable first control surface integrated with the fuselage adjacent to the aft portion of the fuselage; and
   a moveable second control surface integrated with the aft region of the wing outboard of the at least one engine.

43. An aircraft comprising:
   a fuselage configured to carry a payload and having a longitudinal axis, a nose end, a tail end, a forward portion, and an aft portion, the forward portion extending forward directly from the aft portion and defining a generally continuously monotonically tapering planform between the aft portion and the nose end, the aft portion extending aft directly from the forward portion and defining a generally constant-width planform between the forward portion and the tail end;
   a wing extending from the fuselage adjacent to the aft portion of the fuselage, wherein the wing has an upper surface, a lower surface, a forward region with a leading edge, and an aft region with a trailing edge;
   a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage; and a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine.

44. The aircraft of claim 43 wherein the wing includes a fuel volume configured to carry fuel for the propulsion system, and wherein the engine includes rotating components, further wherein the rotating components of the engine are positioned aft of the fuel volume and the passenger cabin.

45. The aircraft of claim 43 wherein each of the first, second, third, and fourth seat sections includes at least 54 passenger seats.

46. An aircraft comprising:

a fuselage configured to carry a payload and having a longitudinal axis, a nose end, a tail end, a forward portion, and an aft portion, the forward portion extending forward directly from the aft portion and defining a generally continuously monotonically tapering planform between the aft portion and the nose end, the aft portion extending aft directly from the forward portion and defining a generally constant-width planform between the forward portion and the tail end;

a wing extending from the fuselage adjacent to the aft portion of the fuselage; and a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage, wherein each of the first, second, third, and fourth passenger seat sections includes a portion having three seats abreast and extending for at least 14 contiguous rows.

47. An aircraft comprising:

a fuselage configured to carry a payload and having a longitudinal axis, a nose end, a tail end, a forward portion, and an aft portion, the forward portion extending forward directly from the aft portion and defining a generally continuously monotonically tapering planform between the aft portion and the nose end, the aft portion extending aft directly from the forward portion and defining a generally constant-width planform between the forward portion and the tail end;

a wing extending from the fuselage adjacent to the aft portion of the fuselage, wherein the wing has an upper surface, a lower surface, a forward region with a leading edge, and an aft region with a trailing edge;

a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage; and a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine, wherein the wing and the propulsion system are configured to operate at a cruise Mach number ranging from about 0.90 to about 0.96.

48. The aircraft of claim 46 further comprising:

a cargo hold positioned within the aft portion of the fuselage;

a fuel volume positioned within the wing and configured to carry fuel; and a center of gravity through which the resultant of the gravitational forces on all components of the aircraft acts, the center of gravity having a first position when the fuel volume is approximately full of fuel and a second position when the fuel volume is approximately empty of fuel, the first and second positions being located within the cargo hold.

49. The aircraft of claim 46 wherein the aft portion of the fuselage further includes an upper fuselage surface spaced apart from a lower fuselage surface, wherein the wing extends from the fuselage between the upper and lower fuselage surfaces adjacent to the aft portion of the fuselage, and wherein the aircraft further comprises:

at least a first window positioned in the upper fuselage surface directly adjacent the first passenger seat section; and at least a second window positioned in the upper fuselage surface directly adjacent the fourth passenger seat section.

50. The aircraft of claim 46 wherein the aft portion of the fuselage has a generally oval cross-sectional shape and the passenger cabin has a width of between about 25 feet and about 35 feet.

51. An aircraft comprising:

a fuselage configured to carry a payload and having a longitudinal axis, the fuselage having a forward portion and an aft portion, the aft portion defining a generally constant-width planform;

a wing extending from the fuselage adjacent to the aft portion of the fuselage;

a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage;

a cargo hold configured to hold cargo and positioned within the aft portion of the fuselage; and a center of gravity through which the resultant of the gravitational forces on all components of the aircraft acts, the center of gravity being positioned within the cargo hold.

52. The aircraft of claim 51 wherein each of the first, second, third, and fourth seat sections includes at least 54 passenger seats.

53. The aircraft of claim 51 wherein each of the first, second, third, and fourth passenger seat sections includes a portion having three seats abreast and extending for at least 14 contiguous rows.

54. An aircraft comprising:
a fuselage configured to carry a payload and having a longitudinal axis, the fuselage having a forward portion and an aft portion, the aft portion defining a generally constant-width planform;
a wing extending from the fuselage adjacent to the aft portion of the fuselage, wherein the wing has an upper surface, a lower surface, a forward region with a leading edge, and an aft region with a trailing edge;
a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage;
a cargo hold configured to hold cargo and positioned within the aft portion of the fuselage;
a center of gravity through which the resultant of the gravitational forces on all components of the aircraft acts, the center of gravity being positioned within the cargo hold; and
a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine, wherein the wing and the propulsion system are configured to operate at a cruise Mach number ranging from about 0.90 to about 0.96.

55. The aircraft of claim 51 wherein the wing has a delta planform.

56. The aircraft of claim 51 further comprising a fuel volume positioned within the wing and configured to carry fuel, wherein the center of gravity has a first position when the fuel volume is approximately full of fuel and a second position when the fuel volume is approximately empty of fuel, the first and second positions being located within the cargo hold.

57. The aircraft of claim 51 wherein the aft portion of the fuselage includes an upper fuselage surface spaced apart from a lower fuselage surface, wherein the aft portion of the fuselage further includes a cargo hold door configured to facilitate loading of cargo into the cargo hold, the cargo hold door being operably integrated with the lower surface of the aft portion of the fuselage along the longitudinal axis of the fuselage.

58. The aircraft of claim 51 wherein the cargo hold has a width of greater than 10 feet and a length of greater than 25 feet.

59. The aircraft of claim 58 wherein the cargo hold has a width of between about 25 feet and about 35 feet, and a length of between about 35 feet and about 45 feet.

60. The aircraft of claim 58 wherein the aircraft further comprises a propulsion system, wherein the wing and the propulsion system are configured to operate at a cruise Mach number ranging from about 0.90 to about 0.96, and wherein the cargo hold has a width of between about 25 feet and about 35 feet, and a length of between about 35 feet and about 45 feet.

61. The aircraft of claim 51 wherein the cargo hold is configured to hold at least 12 Unit Load Device LD-3 cargo containers.

62. The aircraft of claim 51 wherein the cargo hold can accommodate up to four Unit Load Device LD-3 cargo containers positioned abreast.

63. The aircraft of claim 51 wherein the cargo hold has a length greater than about 20 percent of the fuselage length.

64. The aircraft of claim 51 wherein the cargo hold has a width greater than about 18 percent of the wing span.

65. An aircraft comprising:
a fuselage configured to carry a payload and having a longitudinal axis, the fuselage having a forward portion and an aft portion, the aft portion defining a generally constant-width planform;
a wing extending from the fuselage adjacent to the aft portion of the fuselage, the wing having a forward region with a leading edge and an aft region with a trailing edge, the wing further having an upper surface and a lower surface;
a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine;
a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage;
a cargo hold configured to hold cargo and positioned within the aft portion of the fuselage; and
a center of gravity through which the resultant of the gravitational forces on all components of the aircraft acts, the center of gravity being located within the cargo hold.

66. The aircraft of claim 65 wherein each of the first, second, third, and fourth seat sections includes at least 54 passenger seats.

67. The aircraft of claim 65 wherein each of the first, second, third, and fourth passenger seat sections includes a portion having three seats abreast and extending for at least 14 contiguous rows.

68. The aircraft of claim 65 wherein the wing and the propulsion system are configured to operate at a cruise Mach number ranging from about 0.90 to about 0.96.

69. The aircraft of claim 65 wherein the wing has a delta planform.

70. The aircraft of claim 65 further comprising a fuel volume positioned within the wing and configured to carry fuel, wherein the center of gravity has a first position when the fuel volume is approximately full of fuel and a second position when the fuel volume is approximately empty of fuel, the first and second positions being located within the cargo hold.

71. The aircraft of claim 65 wherein the aft portion of the fuselage further includes an upper fuselage surface spaced apart from a lower fuselage surface, wherein the wing extends from the fuselage between the upper and lower fuselage surfaces adjacent to the aft portion of the fuselage, and wherein the aircraft further comprises:
at least a first window positioned in the upper fuselage surface directly adjacent the first passenger seat section; and at least a second window positioned in the upper fuselage surface directly adjacent the fourth passenger seat section.

72. The aircraft of claim 65 further comprising:
a generally horizontal and moveable first control surface integrated with the fuselage adjacent to the aft portion of the fuselage; and
a generally horizontal and moveable second control surface integrated with the aft region of the wing outboard of the at least one engine.

73. The aircraft of claim 65 wherein the aft portion of the fuselage has a generally oval cross-sectional shape and a width of about 29 feet.

74. The aircraft of claim 65 wherein the aft portion of the fuselage has an upper interior surface and a lower interior surface and a floor portion extending horizontally between the upper interior surface and the lower interior surface to separate the passenger cabin from the cargo hold, and wherein the passenger cabin is absent any load-bearing member extending vertically between the floor portion and the upper interior surface between the seat sections.

75. The aircraft of claim 65 wherein the wing includes a fuel volume configured to carry fuel for the propulsion system, and wherein the engine includes rotating components, further wherein the rotating components of the engine are positioned aft of the fuel volume.

76. The aircraft of claim 65 wherein the wing includes a fuel volume configured to carry fuel for the propulsion system, and wherein the engine includes rotating components, further wherein the rotating components of the engine are positioned aft of the fuel volume and the passenger cabin.

77. The aircraft of claim 65 wherein the fuselage has a nose end and a tail end, wherein the forward portion of the fuselage extends forward directly from the aft portion defining a generally continuously monotonically tapering planform between the aft portion and the nose end, and the aft portion extends aft directly from the forward portion defining a generally constant-width planform between the forward portion and the tail end.

78. The aircraft of claim 65 wherein the wing and the propulsion system are configured to operate at a cruise Mach number ranging from about 0.90 to about 0.96, and wherein the cargo hold has a width of between about 25 feet and about 30 feet and a length of between about 35 feet and about 43 feet.

79. A method for manufacturing an aircraft, the method comprising:
attaching a wing to a fuselage having a longitudinal axis, a forward portion, and an aft portion, the aft portion defining a generally constant-width planform, the wing having an upper surface, a lower surface, a forward region with a leading edge, and an aft region with a trailing edge; and
positioning a passenger cabin within the aft portion of the fuselage adjacent to the wing, the passenger cabin having first, second, third, and fourth passenger seat sections, with each of the first, second, third, and fourth seat sections having at least three passenger seats abreast extending for at least 14 contiguous rows, with neighboring passenger seat sections being spaced apart from each other to form first, second, and third passenger aisles positioned at least generally parallel to the longitudinal axis of the fuselage.

80. The method of claim 79 wherein positioning the passenger cabin within the aft portion of the fuselage includes installing at least 54 passenger seats in each of the first, second, third, and fourth seat sections.

81. A method for manufacturing an aircraft, the method comprising:
attaching a wing to a fuselage having a longitudinal axis, a forward portion, and an aft portion, the aft portion defining a generally constant-width planform, the wing having an upper surface, a lower surface, a forward region with a leading edge, and an aft region with a trailing edge;
positioning a passenger cabin within the aft portion of the fuselage adjacent to the wing, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage; and
coupling a propulsion system at least proximate to the aft region of the wing, with at least part of the propulsion system positioned between the upper and lower surfaces of the wing, the propulsion system having at least one inlet aperture positioned beneath the wing lower surface or above the wing upper surface, at least one engine positioned aft of and vertically offset from the at least one inlet aperture, and at least one exhaust nozzle aft of the at least one engine.

82. The method of claim 81 further comprising configuring the wing and the propulsion system to operate at a cruise Mach number ranging from about 0.80 to about 0.98.

83. The method of claim 81 further comprising configuring the wing and the propulsion system to operate at a cruise Mach number ranging from about 0.90 to about 0.96.

84. The method of claim 80 further comprising positioning a cargo hold within the aft portion of the fuselage, wherein a center of gravity through which the resultant of the gravitational forces on all components of the aircraft acts is positioned within the cargo hold.

85. The method of claim 80 further comprising:
positioning a cargo hold within the aft portion of the fuselage, wherein a center of gravity through which the resultant of the gravitational forces on all components of the aircraft acts is positioned within the cargo hold; and
positioning a fuel volume within the wing, the fuel volume configured to carry fuel for the at least one engine, wherein the center of gravity has a first position when the fuel volume is approximately full of fuel and a second position when the fuel volume is approximately empty of fuel, the first and second positions being located within the cargo hold.

86. The method of claim 80 wherein the aft portion of the fuselage further includes an upper fuselage surface spaced apart from a lower fuselage surface, wherein the wing extends from the fuselage between the upper and lower fuselage surfaces adjacent to the aft portion of the fuselage, and wherein the method further comprises:
positioning at least a first window in the upper fuselage surface directly adjacent the first passenger seat section; and
positioning at least a second window in the upper fuselage surface directly adjacent the fourth passenger seat section.

87. The method of claim 80 further comprising:
positioning a cargo hold within the aft portion of the fuselage, wherein a center of gravity through which the resultant of the gravitational forces on all components of the aircraft acts is positioned within the cargo hold; and operably integrating a cargo hold door with a lower surface of the aft portion of the fuselage along the longitudinal axis of the fuselage, the cargo hold door configured to facilitate loading of cargo into the cargo hold.

88. The method of claim 80 wherein the engine includes rotating components, the method further comprising:
positioning a fuel volume in the wing, the fuel volume configured to carry fuel for the propulsion system; and
positioning the rotating components of the engine aft of the fuel volume and the passenger cabin.

89. The method of claim 80 wherein attaching the wing to the fuselage includes mounting the wing to the fuselage adjacent to the aft portion of the fuselage.

90. An aircraft comprising:
a fuselage having a forward portion and an aft portion aligned along a longitudinal axis, the aft portion defining a generally constant-width planform;
a wing extending from the fuselage adjacent to the aft portion of the fuselage;
a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage; and
a propulsion system positioned at least proximate to the wing, the propulsion system having at least one inlet aperture and at least one engine positioned aft of and vertically offset from the at least one inlet aperture.

91. The aircraft of claim 90 wherein the wing includes an upper surface, a lower surface, a forward region with a leading edge, and an aft region with a trailing edge, wherein the propulsion system is positioned at least proximate to the aft region of the wing, and wherein the at least one inlet aperture is positioned beneath the wing lower surface or above the wing upper surface.

92. An aircraft comprising:
a fuselage having a forward portion and an aft portion aligned along a longitudinal axis, the aft portion defining a generally constant-width planform;
a wing extending from the fuselage adjacent to the aft portion of the fuselage, wherein the wing has an upper surface and a lower surface;
a passenger cabin positioned within the aft portion of the fuselage, the passenger cabin having first, second, third, and fourth passenger seat sections, with each of the first, second, third, and fourth seat sections having at least two passenger seats abreast and with neighboring passenger seat sections being spaced apart from each other to form first, second, and third passenger aisles positioned at least generally parallel to the longitudinal axis of the fuselage; and
a propulsion system positioned at least proximate to the wing, with at least part of the propulsion system positioned between the upper and lower surfaces of the wing.

93. The aircraft of claim 92 wherein the wing further includes a forward region with a leading edge and an aft region with a trailing edge, and wherein the propulsion system is positioned at least proximate to the aft region of the wing.

94. The aircraft of claim 3 wherein the wing has a forward region with a leading edge, the leading edge having a first part proximate to the fuselage with a first sweep angle and a second part outboard of the first part with a second sweep angle less than the first sweep angle.

95. The aircraft of claim 3 further comprising:
a cargo hold positioned within the aft portion of the fuselage; and
a center of gravity through which the resultant of the gravitational forces on all components of the aircraft acts, the center of gravity having a position within the cargo hold.

96. The aircraft of claim 3 wherein the aft portion of the fuselage further includes an upper fuselage surface spaced apart from a lower fuselage surface, wherein the wing extends from the fuselage between the upper and lower fuselage surfaces adjacent to the aft portion of the fuselage, and wherein the aircraft further comprises:
at least a first window positioned in the upper fuselage surface directly adjacent the first passenger seat section; and
at least a second window positioned in the upper fuselage surface directly adjacent the fourth passenger seat section.

97. The aircraft of claim 3 further comprising a generally horizontal and moveable elevator surface adjacent to the aft portion of the fuselage.

98. The aircraft of claim 3 wherein the fuselage is configured to carry a commercial passenger payload of at least 230 passengers and/or a commercial cargo payload.

99. The aircraft of claim 4 wherein each of the first, second, third, and fourth seat sections includes at least 54 passenger seats.

100. The aircraft of claim 16 wherein each of the first, second, third, and fourth seat sections includes at least 54 passenger seats.

101. The aircraft of claim 16 wherein the wing has a delta planform.

* * * * *

UNITED STATES PATENT AND TRADEMARK OFFICE
CERTIFICATE OF CORRECTION

| | | |
|---|---|---|
| PATENT NO. | : 7,644,888 B2 | Page 1 of 1 |
| APPLICATION NO. | : 10/146985 | |
| DATED | : January 12, 2010 | |
| INVENTOR(S) | : Mark E. Eakins et al. | |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1171 days.

In column 7, line 14, delete "a" and insert -- an --, therefor.

In column 11, line 55, in claim 4, delete "aperture," and insert -- aperture --, therefor.

In column 22, line 33, in claim 84, delete "claim 80" and insert -- claim 79 --, therefor.

In column 22, line 39, in claim 85, delete "claim 80" and insert -- claim 79 --, therefor.

In column 22, line 50, in claim 86, delete "claim 80" and insert -- claim 79 --, therefor.

In column 22, line 63, in claim 87, delete "claim 80" and insert -- claim 79 --, therefor.

In column 23, line 5, in claim 88, delete "claim 80" and insert -- claim 79 --, therefor.

In column 23, line 11, in claim 89, delete "claim 80" and insert -- claim 79 --, therefor.

Signed and Sealed this

Twentieth Day of July, 2010

David J. Kappos
*Director of the United States Patent and Trademark Office*